(12) United States Patent
Matsumoto et al.

(10) Patent No.: US 8,125,593 B2
(45) Date of Patent: Feb. 28, 2012

(54) COLOR FILTER SUBSTRATE INCLUDING SUPPORT MEMBERS AND DISPLAY DEVICE USING THE SAME

(75) Inventors: Kazuhito Matsumoto, Nara (JP); Noriaki Ohnishi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 582 days.

(21) Appl. No.: 12/088,952

(22) PCT Filed: Jul. 7, 2006

(86) PCT No.: PCT/JP2006/313607
§ 371 (c)(1),
(2), (4) Date: Apr. 2, 2008

(87) PCT Pub. No.: WO2007/046170
PCT Pub. Date: Apr. 26, 2007

(65) Prior Publication Data
US 2009/0231523 A1 Sep. 17, 2009

(30) Foreign Application Priority Data
Oct. 18, 2005 (JP) ................... 2005-303536

(51) Int. Cl.
*G02F 1/1335* (2006.01)
*G02F 1/1339* (2006.01)
(52) U.S. Cl. ............ 349/106; 349/110; 349/155
(58) Field of Classification Search ............ 349/106, 349/155, 110
See application file for complete search history.

(56) References Cited

U.S. PATENT DOCUMENTS

| | | | |
|---|---|---|---|
| 5,978,061 A | 11/1999 | Miyazaki et al. | |
| 6,384,882 B1 * | 5/2002 | Nagayama et al. | 349/110 |
| 2003/0112405 A1 | 6/2003 | Kim et al. | |
| 2004/0201799 A1 * | 10/2004 | Nakayoshi et al. | 349/106 |
| 2006/0215105 A1 * | 9/2006 | Hsiao | 349/155 |

FOREIGN PATENT DOCUMENTS

| | | |
|---|---|---|
| JP | 9-73093 A | 3/1997 |
| JP | 2001-188227 A | 7/2001 |
| JP | 2002-277865 A | 9/2002 |
| JP | 2002-341354 A | 11/2002 |
| JP | 2003-29269 A | 1/2003 |
| JP | 2003-149630 A | 5/2003 |
| JP | 2003-195318 A | 7/2003 |
| JP | 2005-070442 A | 3/2005 |
| JP | 2005-70808 A | 3/2005 |

OTHER PUBLICATIONS

Official communication issued in the International Application No. PCT/JP2006/313607, mailed on Oct. 10, 2006.

* cited by examiner

*Primary Examiner* — Nathanael R Briggs
(74) *Attorney, Agent, or Firm* — Keating & Bennett, LLP

(57) ABSTRACT

A color filter substrate includes a light shielding layer arranged along the outer periphery of a display region on a glass substrate and defining a light shielding region and support members arranged so as to stand on the display region and a light shielding region of the glass substrate. The total height of the light shielding layer of the light shielding region and the support members disposed on the light shielding layer thereof is larger than the total height of a color layer in the display region and the support members disposed on the color layer thereof, and a panel thickness buffering region is located in a display region side peripheral portion of the light shielding region.

12 Claims, 7 Drawing Sheets

COLOR FILTER SUBSTRATE INCLUDING SUPPORT MEMBERS AND DISPLAY DEVICE USING THE SAME

BACKGROUND OF THE INVENTION

1. Field of the Invention

The present invention relates to a color filter substrate and a display device including such a color filter substrate.

2. Description of the Related Art

Currently, generally-used liquid crystal display devices are composed in such a fashion that a liquid crystal layer is interposed between a pair of substrates in which electrodes are provided. In a liquid crystal display device for color display, pixels are arranged in a matrix configuration in one of the opposed substrates, and a color layer made of color resin materials colored in red (R), green (G), and blue (B) is arranged in each pixel.

In a liquid crystal display device having such a structure, the pair of opposed substrates are bonded to each other with column-shaped or bead-shaped spacers interposed in a display region displaying an image to thus keep a given space between the substrates. This is for suppressing display irregularity in the display region which is caused mainly due to change in width of the space between the substrates in external load application in the pressing step of panel manufacture, during use, and the like.

While in a light shielding region, only a light shielding layer is arranged, so that the space between the paired substrates is not uniformly maintained. This invites display irregularity caused due to severe change in width of the space between the substrates in the peripheral part of the display region near the light shielding region. The display irregularity lowers the display quality remarkably and also lowers the manufacturing yield. These disadvantages are significant especially in LCDs, ultra-slim LCDs, and the like incorporating a driver in the light shielding region for which developments progresses recently. In the LCDs incorporating the driver in the light shielding region, which must be wide, load application to the surfaces of the substrates increases causing non-uniform changes in width of the space between the substrates. In the case of an ultra-slim LCD having substrates with a thickness of, for example, 0.7 mm or smaller, a load applied to the surfaces of the substrates greatly influences the space between the substrates.

In order to tackle the above problems, it has been proposed to provide column-shaped or bead-shape spacers also in the light shielding region, as shown in FIG. 10 to FIG. 12. FIG. 10 shows a transflective type liquid crystal display device 130 including a reflection region and a transmission region in the display region and column-shaped spacers 180. FIG. 11 shows a reflective type or transmissive type liquid crystal display device 131 including column-shaped spacers 185. FIG. 12 shows a reflective type or transmissive type liquid crystal display device 132 including bead-shaped spacers 188. In each of the liquid crystal display devices 130 to 132, a thin film transistor substrate 135 and an opposed color filter substrate 140 including a color layer 160 are bonded to each other by means of a sealant 141 so as to interpose a liquid crystal layer 150. In each of the conventional liquid crystal display devices 130 to 132 shown in FIG. 10 to FIG. 12, the color layer as in the display region is not formed in the light shielding region 190. Therefore, even when spacers similar to those in the display region are provided, the spacers do not reach the opposed substrate. Accordingly, the light shielding region 190 of one of the substrates easily warps by load application in the pressing step of panel manufacture. This means insufficient effects of suppressing display irregularity expected.

The thickness of the substrate in the light shielding region 190 may be set to the same thickness as that in the display region by forming in the light shielding region 190 spacers that are higher by the height of the color layer than the spacers in the display region. This requires, however, formation of the spacers in the light shielding region 190 in an additional step and is, therefore, inappropriate for solving the problems in view of the manufacturing cost and yield.

In view of the foregoing, in order to solve the above problems, for example, Japanese Unexamined Patent Application Publication 2002-277865 discloses a liquid crystal display device including: an array substrate including pixel electrodes and a switching active element driving the pixel electrodes; a color filter substrate including a color film and a counter electrode for the pixel electrodes on a pattern of a light shielding film; and column-shaped spacers of a predetermined height in a predetermined pattern formed on the color filter substrate at a predetermined density, wherein liquid crystal is sealed in the space between the array substrate and the color filter substrate, and the column-shaped spacers formed outside the display region on the color filter substrate are layered on a color film in at least one color and the light shielding film. Japanese Unexamined Patent Application Publication 2002-277865 describes that the column-shaped spacers outside the display region suppress display irregularity in the vicinity of the peripheral part of the panel.

Japanese Unexamined Patent Application Publication 2005-070442 discloses a liquid crystal display device in which a liquid crystal composition is interposed between a pair of substrates, wherein the display part displaying an image includes a color filter layer formed of at least one kind of coloring resin material in each pixel, the light shielding part along the outer periphery of the display part includes a light shielding layer made of a light shielding resin material and light shielding column-shaped spacers keeping the cell gap between the paired substrates, and the light shielding column-shaped spacers are formed by overlaying a first layer made of a coloring resin material with a second layer made of a light shielding resin material. Japanese Unexamined Patent Application Publication 2005-070442 describes that the liquid crystal display device can make the cell gap uniform and can prevent lowering of the display quality and of the manufacturing yield.

The technical schemes for controlling the width of the space between the substrates disclosed in Japanese Unexamined Patent Application Publication 2002-277865 and Japanese Unexamined Patent Application Publication 2005-070442 are shown in FIG. 13 to FIG. 15. FIG. 13 shows a transflective type liquid crystal display device 151 including the reflection region and the transmission region in the display region and column-shaped spacers 180. FIG. 14 shows a reflective type or transmissive type liquid crystal display device 152 including column-shaped spacers 185. FIG. 15 shows a reflective type or transmissive type liquid crystal display device 153 including bead-shaped spacers 188.

Each of the liquid crystal display devices shown in FIG. 13 to FIG. 15 includes, between the spacers and the like and the light shielding layer, the same color layer 160 as that provided in the display region. This allows the spacers to reach the opposed substrate similar to those in the display region to suppress warp caused by load application to the light shielding region 191, as shown in FIG. 13 to FIG. 15.

In each of the liquid crystal display devices 151 to 153 shown in FIG. 13 to FIG. 15, however, the presence of the light shielding layer spacers below the color layer 160 in the light shielding region 191 increases the width of the space between the substrates in the light shielding layer when compared with that in the display region. This invites swelling of only the light shielding region 191 upon load application to the surfaces of the substrates. Swelling of the light shielding region 191 invites display irregularity caused due to severe change in the width of the space between the substrates in the peripheral part of the display region near the light shielding region 191.

SUMMARY OF THE INVENTION

In order to overcome the problems described above, preferred embodiments of the present invention provide a color filter substrate that suppresses and minimizes display irregularity and a display device including such a novel color filter substrate.

A color filter substrate in accordance with a preferred embodiment of the present invention is a color filter substrate that is preferably used in a display panel, and includes: a transparent substrate; a color layer provided on the transparent substrate and defining a display region; a light shielding layer arranged along an outer periphery of the display region on the transparent substrate and defining a light shielding region; and support members arranged so as to stand on the display region and the light shielding region of the transparent substrate, wherein a total height of the light shielding layer of the light shielding region and the support members disposed on the light shielding layer is larger than a total height of the color layer in the display region and the support members disposed on the color layer thereof, and a panel thickness buffering region is located in a peripheral portion on a display region side of the light shielding region.

Description will be given herein with reference to the drawings about changes in substrate thickness by load application in the pressing step of panel manufacture or the like in display devices using the above color filter substrate and a conventional color filter substrate.

FIG. 6 shows the display device using the conventional color filter substrate. When a load is applied downwardly and upwardly to the display device, the light shielding region warps entirely, as shown in FIG. 7, causes a large difference in panel thickness in the outer peripheral portion 100 of the display region, thereby causing display irregularity around the outer periphery of the display portion. In contrast, in the display device using the color filter substrate in accordance with preferred embodiments of the present invention shown in FIG. 8, no such large difference in panel thickness is formed in the outer peripheral portion 109 of the display region even though load application occurs in the pressing step of panel manufacture or the like. Because, the same support members supporting the opposed substrates 90, 91 are not formed therebetween in the display region side peripheral portion 103 of the light shielding region 102 where the panel thickness is larger by the thickness of the light shielding layer 94 than the display region, and accordingly, the display region side peripheral portion 103 between the regions of which panel thickness are different from each other serves as a buffer region (a panel thickness buffering region 103) to absorb local changes in cell thickness and stress on the step in the panel after the pressing steps for liquid crystal injection to the panel, for bonding, and the like, thereby suppressing color irregularity and cell thickness irregularity liable to be caused in the display region side peripheral portion.

Another color filter substrate in accordance with a preferred embodiment of the present invention is a color filter substrate that is preferably used in a display panel, and includes: a transparent substrate; a color layer provided on the transparent substrate and defining a display region; and a light shielding layer arranged along an outer periphery of the display region on the transparent substrate and defining a light shielding region, wherein a step having the same thickness as the color layer located in the display region is disposed on the light shielding layer of the light shielding region, and a panel thickness buffering region is located in a peripheral portion on the display region side of the light shielding region.

With the above arrangement, a display device using bead-shaped spacers can be attained rather than a display device including the support members in the aforementioned color filter substrate. In such a display device, as well, the display region side peripheral portion located in the light shielding region serves as a buffer region to absorb local changes in cell thickness and stress on the step in the panel after the pressing steps for liquid crystal injection to the panel, for bonding, and the like, thereby suppressing color irregularity and cell thickness irregularity liable to be caused in display region side peripheral portion.

A display device in accordance with a preferred embodiment of the present invention is a display device including a display panel including first and second substrates opposed to each other and a display medium layer interposed therebetween, and further includes: a plurality of support members arranged on one of the first and second substrates so as to reach the other substrate in a display region and a light shielding region arranged along an outer periphery of the display region, wherein a total height of the light shielding layer in the light shielding region and the support members disposed on the light shielding layer is larger than a total height of the color layer in the display region and the support members disposed on the color layer, and a panel thickness buffering region is located in a peripheral portion on a display region side of the light shielding region.

In the display device having the above arrangement, no support members supporting the opposed substrates are formed therebetween in the display region side peripheral portion of the light shielding region where the panel thickness is larger by the thickness of the light shielding layer than the display region, as described above. Accordingly, the display region side peripheral portion intervening between the regions of which panel thicknesses and stress on the step in the panel are different from each other serves as a buffer region to absorb local changes in cell thickness after the pressing step for liquid crystal injection to the panel, for bonding, and the like, thereby suppressing color irregularity and cell thickness irregularity liable to be caused in the display region side peripheral portion.

In the display device in accordance with a preferred embodiment of the present invention, each of the support members between the light shielding layer and a substrate opposed thereto may include a step having substantially the same thickness as the color layer formed in the display region, and a support portion extending from the step so as to reach the substrate opposed thereto.

With the above arrangement, any of steps having various forms may be formed as the step on a color filter substrate in a multi-gap structure, which eliminates the need to form an additional step, thereby achieving excellent manufacturing efficiency.

Further, in the display device in accordance with a preferred embodiment of the present invention, the step may be composed of the same color layer as the color layer formed in the display region.

With the above arrangement, the color layer can be formed in the light shielding region in the same step as the step of forming the color layer in the display region. This eliminates the need to form the step in an additional step, leading to excellent manufacturing efficiency.

In the display device in accordance with a preferred embodiment of the present invention, at least one bonding member arranged to bond the first substrate and the second substrate may be provided at an outer peripheral portion of the light shielding region, and the at least one bonding member may be spaced from the step.

It is preferable for controlling the space between the substrates to form a gap having a predetermined width while an inter-substrate space maintaining material is mixed with the substrate bonding member. The gap absorbs spreading of the sealing resin and secures the patterning margin at the step as well as exhibition of a buffering function in space control. When the sealing resin with which the inter-substrate space maintaining material is mixed and the step overlap with each other, the overlap portion increases in thickness locally to cause cell thickness irregularity in the display portion adjacent thereto.

Further, in the display device in accordance with a preferred embodiment of the present invention, the panel thickness buffering region may have a width in a range between about 0.05 times and about 0.8 times a width from an outer peripheral end of the display region to an inner peripheral end of the at least one bonding member, wherein the range is inclusive.

Preferably, the panel thickness buffering region has an appropriate width relative to the width between the outer peripheral end of the display region and the inner peripheral end of the at least one bonding member. Particularly, when it is set in the inclusive range between about 0.05 times and about 0.8 times the width between the outer peripheral end of the display region and the inner peripheral end of the at least one bonding member, display irregularity is further suppressed.

In the display device in accordance with a preferred embodiment of the present invention, a recess may be formed in the peripheral portion on the display region side of the light shielding region.

In the above arrangement, in forming the color layer in the display region and the light shielding region in the same step, the color layer is formed selectively in a region except the display region side peripheral portion of the light shielding region to thus form the panel thickness buffering region in the display region side peripheral portion of the light shielding region, whereby a recess that is recessed from the surrounding where no color layer is located is formed. When the spacers are formed in the same step thereafter, the support members not reaching the opposed substrate are formed in only the display region side peripheral portion of the light shielding region. Thus, the panel thickness buffering region can be formed simply and efficiently in the manufacturing process.

Further, in the display device in accordance with preferred embodiments of the present invention, each of the support members formed on the display region and the light shielding region may be formed on one of the substrates.

With the above arrangement, the support members in both the display region and the light shielding region can be formed in the same step to achieve excellent manufacturing efficiency.

In the display device in accordance with a preferred embodiment of the present invention, the support members may be arranged at regular intervals.

With the above arrangement, the support members arranged at regular intervals support uniformly the light shielding region and the display region against external load application accompanied by the pressing steps and the like. This suppresses local display irregularity effectively.

Moreover, in the display device in accordance with a preferred embodiment of the present invention, the display region may include a light transmission region and a light reflection region.

The above arrangement eliminates the need to provide the step having the same thickness as the color layer in the light shielding region in some cases, for example, where the light shielding layer in the light shielding region is thick or the like. These cases only require formation of the spacers in the light shielding region, thereby leading to efficient device manufacture.

In the display device in accordance with a preferred embodiment of the present invention, a driver may be provided in the light shielding region.

In a display device using a thin film transistor substrate in which a driver is incorporated, the light shielding region must be wide. Accordingly, the width between the end of the display region and the end of the substrate bonding member is smaller in the driver formation portion than in the driver non-formation portion, which means that the range between the display region and the sealant of the substrate bonding member is asymmetric. For this reason, changes in cell thickness increase in the display region side peripheral portion of the wide driver formation portion by influence of pressure and the like in a press-sealing step after display medium injection and the like to invite display irregularity. Further, in such a display device, though non-uniformity of change in width of the space between the substrates caused due to load application to the surfaces of the substrates may increase, the above arrangement suppresses remarkably the display irregularity caused due to such change in width of the space between the substrates.

Moreover, in the display device in accordance with a preferred embodiment of the present invention, the at least one bonding member may be arranged continuously around the display region so as to surround the display region.

In general, in manufacturing a display device in which the display region is surrounded by at least one bonding member extending continuously around the periphery of the display region, namely, a display device with no sealing port, the display device is subjected to fixing/uniforming step by ultraviolet (UV) ray irradiation and substrate pressing using a photo-curing (UV-curing) or photo-curing (UV-curing)/thermosetting resin for bonding and fixing the first substrate and the second substrate by way of the at least one bonding member.

Particularly, in the case where a liquid crystal composition in a form of a fluid is used as the display medium, bonding resin containing uncured photo-curing resin is provided with no cut formed continuously around the outer periphery of a substrate so as to surround the display region after an alignment film is formed on a substrate, and then, one drop filling of the liquid crystal compound is performed. Then, the upper and lower substrates are bonded to each other under a vacuum condition, and the panel pressing is performed in an open air environment. Heating may be performed in some cases. In these cases, the liquid crystal material of the display medium is in contact with the uncured resin to be pressed and fixed thereto, which causes local pressure concentration on a region of the substrate which is liable to be deformed by pressure. Accordingly, cell pressure irregularity is liable to be significant around the sealant at the periphery of the panel manufactured by injecting the liquid crystal material through an injection port under a vacuum condition after the panel bonding step.

When the above technique in accordance with a preferred embodiment of the present invention is applied to the above cases, the panel thickness buffering region absorbs the thickness irregularity effectively to suppress display irregularity effectively.

In the display device in accordance with a preferred embodiment of the present invention, the first substrate may have a thickness different from the second substrate.

When a thin film transistor substrate as the first substrate and an opposed color filter substrate as the second substrate are thinned relatively, local heating and pressure are caused at the end of the substrates where a connection terminal, a driver, and the like are mounted directly to the thin film transistor substrate to invite breakage of the thin film transistor substrate thinner than a given thickness. With the above arrangement, however, such breakage can be prevented. Further, the thin film transistor substrate formed of multiple thin films for a terminal, a wiring, and the like is subjected to deformation accompanied by thermal contraction and compressive contraction and history through a step of stacking the thin films. The above arrangement prevents lowering of the mechanical strength which is caused due to thinning of the thin film transistor substrate.

Furthermore, in the display device in accordance with a preferred embodiment of the present invention, at least one of the first substrate and the second substrate may have a thickness of about 0.5 mm or smaller.

With the above arrangement, in the case where the glass should be thinned for thinning and weight reduction of the panel as a whole, thinning can be achieved by thinning the glasses of the first and second substrates to the same thickness or by thinning the glasses of the first and second substrate to the different thicknesses.

As described above, various preferred embodiments of the present invention provide a color filter substrate favorably suppressing display irregularity and a display device using it.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

A color filter substrate 30 and a liquid crystal display device including such a color filter substrate 30 in accordance with preferred embodiments of the present invention will be described below in detail with reference to the accompanying drawings. It is noted that the present invention is not limited to the following preferred embodiments.

Further, as an example of preferred embodiments of the present invention, description will be given of a thin liquid crystal display device especially applied to a portable electronic tool, such as a mobile phone.

Figure 1:
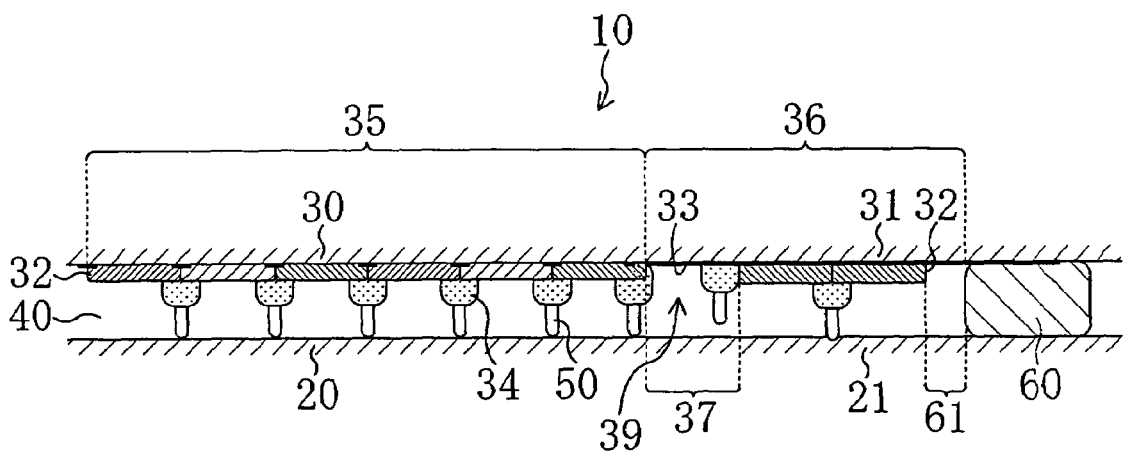
FIG. 1 is a sectional view of a liquid crystal display device and a color filter substrate in accordance with a preferred embodiment of the present invention.

Structures of Color Filter Substrate 30 and Liquid Crystal Display Device 10 Including Same FIG. 1 is a sectional view of a liquid crystal display device 10. The liquid crystal display device 10 preferably is of transflective type capable of performing both transmissive mode display and reflective mode display.

The liquid crystal display device 10 includes a liquid crystal panel composed of a thin film transistor substrate 20 and a color filter substrate 30, which are opposed to each other, a liquid crystal layer 40 (a display medium layer) provided therebetween, and column-shaped spacers 50 provided between the opposed substrates 20, 30, a backlight unit (not shown), and the like.

In a case of, for example, normally black (NB) mode achieved by a non-rubbing process, an active element, circuit elements, such as a gate wiring, a source wiring, and the like connected to the active element, and a driver 88 are provided on the surface of a glass substrate 21 of the thin film transistor substrate 20. In a region of the thin film transistor substrate 20 which serves as a reflection region, a reflection layer including a bumpy resin layer and an Al or Al-containing metal film are formed, and a transparent insulating layer is arranged so as to cover the reflection layer for flattening the bumpy surface of the reflection layer. Transparent pixel electrodes and a homeotropic orientation film are formed in this order on the flat surface of the transparent insulating layer. The pixel electrodes are divided to a plurality of pixel patterns. When a predetermined voltage is applied to the liquid crystal layer 40, a liquid crystal domain causing a radial inclined orientation is formed in the corresponding pixel pattern. The liquid crystal domain with the radially inclined orientation attains a wide viewing angle.

It is noted that the technique of preferred embodiments of the present invention is applicable to a liquid crystal display device in any of a twisted nematic (TN) mode in which the orientation of the liquid crystal layer is controlled uniformly by the rubbing process and a normally white (NW) mode and a normally black (NB) mode achieved by electrically controlled birefringence (ECB) mode.

The color filter substrate 30 preferably is a glass substrate 31 thinner than the glass substrate 21 of the thin film transistor substrate 20, on which a color layer 32 of three primary colors of red (R), green (G), and blue (B) is formed. A black matrix 33 (a light shielding layer) as a fringe for contrast is formed around the outer periphery of the color layer 32 to form a light shielding region 36. The color layer 32 may include complementary colors of cyan, magenta, and yellow besides the combination of RBG. The color layer 32 is formed also on the black matrix 33 to form a step 32. The color layer 32 is not formed in a display region side peripheral portion 37 (a panel thickness buffering region) of the light shielding region.

The column-shaped spacers 50 extend from the color filter substrate 30 with a transparent dielectric layer 34 interposed to reach the thin film transistor substrate 20. Each column-shaped spacer 50 and the transparent dielectric layer 34 define a support member. The column-shaped spacers 50 are arranged at regular intervals in a display region 35 of the color filter substrate 30. The column-shaped spacers 50 are formed also on the black matrix 33 in the light shielding region 36 with the color layer 32 interposed. Since the column-shaped spacers 50 are formed on the transparent dielectric layer 34, the space between the substrates 20, 30 is larger in the region where the color layer 32 is formed on the black matrix 33 by the thickness of the black matrix 33 than in the display region 35. Further, the column-shaped spacers 50 are arranged on the transparent dielectric layer 34 in the display region side peripheral portion 37 where no color layer 32 is formed on the black matrix 33. The color layer 32 is not formed in the display region side peripheral portion 37, and therefore, the column-shaped spacers 50 do not reach the opposed substrate 20 and do not contribute to maintaining of the space between the substrates. Specifically, a region 37 not restricting the space between the substrates is formed between the display region 35 where the column-shaped spacers 50 maintain the space between the substrates at a predetermined width and the light shielding region 36 where the space between the substrates is large by the column-shaped spacers 50 formed on the color layer 32 formed on the black matrix 33.

The column-shaped spacers 50 may have any shape, such as a cylindrical shape, a rectangular column shape, a tapered shape, and the like. The column-shaped spacers 50 are preferably made of resin in the present preferred embodiment, but the material thereof is not limited thereto as long as it can withstand the pressure to the substrates and may be made of ceramic or metal.

An orientation controller is disposed in a region serving as a transmission region of the color filter substrate 30. The alignment controller is disposed on the liquid crystal layer 40 side of the homeotropic orientation film and extends toward the opposed thin film transistor substrate 20. The transparent dielectric layer 34 is disposed in a region serving as a reflection region of the color filter substrate 30. The transparent dielectric layer 34 is disposed on the liquid crystal layer 40 side of the homeotropic orientation film so as to have a predetermined thickness.

A sealant 60 is provided in the outer peripheral region of the black matrix 33 between the thin film transistor substrate 20 and the color filter substrate 30 so as to bond the substrates to each other. The sealant 60 is arranged so as to surround the display region 35 continuously with neither a cut nor a sealing port formed therein. The sealant 60 is cured by ultraviolet ray (UV) irradiation or a combination of ultraviolet ray (UV) irradiation and heat. An inter-substrate space maintaining material is mixed with the sealant 60. The inter-substrate space maintaining material is made of a material having high hardness and high compressive strength, such as silica-containing grains, fiber, or the like.

A gap 61 having a width of approximately 0.5 to 1.5 mm, for example, is preferably formed between the outer end of the color layer 32 on the black matrix 33 and the inner end of the sealant 60. When the width of the gap 61 is smaller than about 0.5 mm, it is difficult for a sufficient margin to be secured. On the other hand, when it is larger than about 1.5 mm, a buffering effect reduces. With no inter-substrate space maintaining material mixed with the sealant 60, the gap 61 may not be formed between the outer end of the color layer 32 on the black matrix 33 and the inner end of the sealant 60 so that they are in contact with each other. When the inter-substrate space maintaining material is not mixed with the sealant 60, variation in finished patterns of the elements, such as the column-shaped spacers 50, the step 32, and the like can be reduced easily. Further, the materials of the sealant 60 can be exchanged remarkably efficiently in manufacturing multiple kinds of display devices having design specifications different from each other on the same line, which greatly contributes to cost reduction. In the case where the same kind of sealant 60 is used (only the inter-substrate space maintaining materials are different from each other), material loss reduces remarkably.

In the present preferred embodiment, the column-shaped spacers 50 may not be arranged in the display region side peripheral portion 37 where the color layer 32 is not formed on the black matrix 33. Further, only the color layer 32 may be formed on the black matrix 33 in the display region side peripheral portion 37 or a recess 39 may be formed in the region with no color layer 32 formed. Alternatively, only the transparent dielectric layer 34 may be formed therein. Furthermore, the color layer 32 formed on the black matrix 33 is not limited thereto, and another step structure having the same thickness as the color layer 32 may be formed in lieu thereof. In sum, the only requirement is not to form, from one of the substrates 20, 30 to the other substrate, a support member restricting change in width of the space between the substrates in the display region side peripheral portion 37.

The column-shaped spacers 50 in the present embodiment are preferably disposed on the color filter substrate 30, but the present invention is not limited thereto and the spacers 50 may be disposed on the thin film transistor substrate 20. Alternatively, some of them may be disposed on one of the substrates while the other are disposed on the other substrate.

Further, the thicknesses of the glass substrate 31 of the color filter substrate 30 and the glass substrate 21 of the thin film transistor substrate 30 are not limited specifically. The thin film transistor substrate 20 may be thinner than the color filter substrate 30 or may have the same thickness as the color filter substrate 30.

The light shielding region 36 may not reach the sealant 60 on the color filter substrate 30 in the present preferred embodiment. In other words, the sealant 60 may be spaced from the outer peripheral end of the black matrix 33 on the color filter substrate 30.

Figure 2:
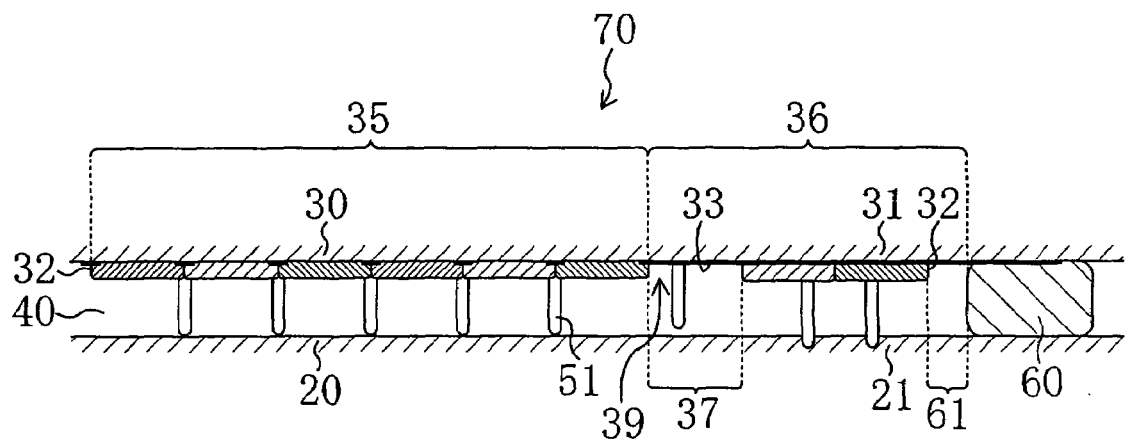
FIG. 2 is a sectional view of a reflective type or transmissive type liquid crystal display device in which only column-shaped spacers are provided without providing a transparent dielectric layer.
Figure 3:
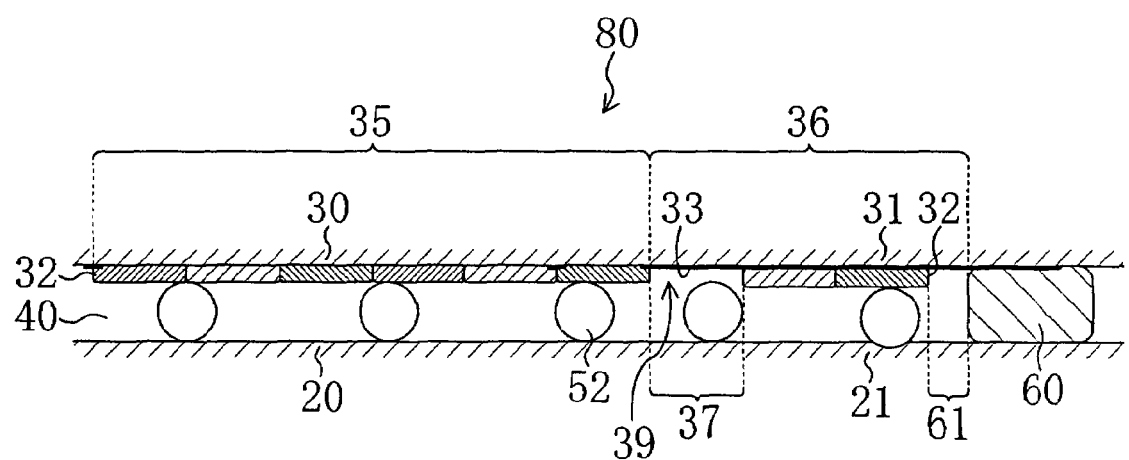
FIG. 3 is a sectional view of a reflective type or transmissive type liquid crystal display device in which only bead-shaped spacers are provided without providing the transparent dielectric layer and the column-shaped spacers.

The present preferred embodiment refers to the transflective type liquid crystal display device 10 in which the column-shaped spacers 50 are arranged on the color filter substrate 30 with the transparent dielectric layer 34 interposed, but the present invention is not limited thereto. The present invention may be applied to a reflective type or transmissive type liquid crystal display device 70 in which the column-shaped spacers 50 are arranged with no dielectric layer interposed, as shown in FIG. 2. The present invention is applicable also to a reflective type or transmissive type liquid crystal display device 80 in which only bead-shaped spacers 52 are arranged rather than the column-shaped spacers are arranged with no dielectric layer interposed, as shown in FIG. 3.

Method for Manufacturing Color Filter Substrate 30

One example of a method for manufacturing the color filter substrate 30 according to the present preferred embodiment will be described next in detail.

First, the substrate 31 (glass substrate) is prepared. Then, the black matrix 33 having a width of about 5 µm to about 50 µm is formed by sputtering the light shielding region 36 of the substrate 31. A resin film (dry film) in which a red pigment is dispersed is laminated on each entirety of the display region 35 and the light shielding region 36 of the substrate 31 and is subjected to exposure, development, and baking (heat treatment) to form a first color layer 32 (red). Next, a resin film in which a green pigment is dispersed is overlaid and laminated on the entirety of the first color layer 32 and is subjected to exposure, development, and baking (heat treatment) to form a second color layer 32 (green). Further, a third color layer 32 (blue) is formed in the same manner. Wherein, the color layer 32 is not formed in the display region side peripheral portion 37 having a predetermined width in the light shielding region 36.

The color filter 32 may be arranged in a striped layout or in a delta layout. For forming the color layer 32, photosensitive resin materials in which pigments are dispersed may be applied onto entire surfaces by spinning or slit coating rather than lamination of the dry films. Further, the sequence for color formation of the color layer 32 is not limited specifically and another sequence may be employed.

Subsequently, ITO (Indium Tin Oxide) is deposited on the uppermost layer of the color layer 32 to form the transparent electrodes (not shown).

Thereafter, the transparent dielectric layer 34 is formed on the transparent electrodes in the reflection region of the display region 35.

Next, the column-shaped spacers 50 made of a photosensitive resin or the like are formed on the transparent dielectric layer 34. The column-shaped spacers 50 are formed in both the display region 35 and the light shielding region 36 by photolithography in a single step. This completes the manufacture of the color filter substrate 30.

The color layer 32 serves as the step in the light shielding region 36 in the present preferred embodiment. In the case where the transparent dielectric layer 34 is provided to serve as the step therein in lieu thereof, the transparent dielectric layer 34 is located in the light shielding region 36 in the step of forming the transparent dielectric layer 34 in the reflection region of the display region 35 without performing the aforementioned step of forming the color layer 32 in the light shielding region 36. In this case, the transparent dielectric layer 34 is not formed in the display region side peripheral portion 37 having a predetermined width in the light shielding region 36, as well.

The present preferred embodiment describes the color filter substrate for a liquid crystal display device in which the column-shaped spacers are formed. In a case with bead-shaped spacers provided, however, the spacers are not formed on the color filter substrate.

Method for Manufacturing Liquid Crystal Display Device 10

One example of a method for manufacturing the liquid crystal display device 10 according to the present preferred embodiment will be described next in detail.

Manufacture of Color Filter Substrate 30

The same color filter substrate 30 as above is manufactured by the same steps as above.

Manufacture of Thin Film Transistor Substrate 2

Next, the substrate 21 (glass substrate) is prepared, and the gate electrodes of Ta or Al/Ti are formed by sputtering and patterning. Then, SiNx as a gate insulating film and semiconductor a-Si as a thin film are formed. After SiNx as an etching protection film is formed and patterned, the interlayer insulating film is formed. Next, ITO is vacuum-evaporated to form the transparent electrodes. Then, contact holes, the drain electrodes, and the source electrodes are formed. Further, the driver 88 is formed at the end part of the substrate 21 in the same or another step to form thin film transistors.

Arrangement of Spacers

When bead-shaped spacers are used rather than the column-shaped spacers, a spacer arranging step is necessary. In this step, the spacers are arranged by spraying on a substrate by ink jetting a fluid dispersion prepared by dispersing spherical plastic beads having a diameter of about 3 µm to about 10 µm into a solvent of, for example, water/IPA, water/ethylene glycol, ethylene glycol, or the like.

Rather than the above fixed-point dispersion method for selectively arranging the bead-shaped spacers, there may be employed a wet spraying method in which the spacer fluid dispersion is volatilized and dispersed while being sprayed through a spray nozzle, a dry spraying method in which the spacer members (including the case performing electrification) is distributed and sprayed on a substrate through dried air current, or the like.

Formation of Liquid Crystal Cell

Next, a liquid crystal material is dripped at, for example, about 2 mg per one shot onto the thin film transistor substrate 20 by a dispenser or the like. The liquid crystal material is dripped inside the sealant 60 coated into a frame-like shape along the outer periphery of the light shielding region 36 of the thin film transistor 20. Then, the color filter substrate 30 is aligned and bonded to the thin film transistor substrate 30 on which the liquid crystal material is dripped. This step is performed in a vacuum state. The bonded substrates are then returned to the air to allow the liquid crystal material between the thin film transistor substrate 20 and the color filter substrate 30 bonded to each other to be diffused by the air pressure. A UV ray is irradiated to the sealant 60 with a UV light source moved along the region where the sealant 60 is applied, thereby curing the sealant 60. In this way, the diffused liquid crystal material seals the two substrates to form the liquid crystal cells. Then, the liquid crystal display device 10 is completed with the use thereof.

Alternatively, the liquid crystal cells may be formed in such a manner, rather than the manner as in the present preferred embodiment, that a liquid crystal injection port is formed on the side of the liquid crystal panel; the liquid crystal material is injected therethrough; and then, the liquid crystal injection port is sealed by a ultraviolet curable resin or the like.

It is much more effective to arrange the column-shaped spacers 50 applicable in the present preferred embodiment at predetermined positions of the panel through the photolithography step. For this reason, the material of the column-shaped spacers 50 must be excellent in resolution and development at patterning, must have high mechanical strength and high transmissivity, and should pollute less the liquid crystal.

Specifically, as an applicable material, there are a negative type photosensitive material of which curing proceeds by exposure and a positive type photosensitive material which is cleft by exposure and of which solution proceeds selectively through development. For example, in view of maintaining the transmissivity and the mechanical strength of the material, when a photosensitive resin of which main material is resin including an acrylate-based material, a urethane-acrylate-based material, an epoxy-acrylate-based material, a methacrylate-based material, or the like, pattern formation is enabled.

The present preferred embodiment refers to an LCD (liquid crystal display) as a display device and a color filter substrate used therein, but is applicable to any display device of a PD (plasma display), a PALC (plasma addressed liquid crystal display), an organic EL (organic electroluminescence), a FED (field emission display), a SED (surface-conduction electron-emitter display), and the like and the color filter substrate used therein.

Working Example

Examination of influences on display irregularity where an external load is applied was performed on the liquid crystal display device of the present preferred embodiment.

Test Evaluation

An evaluation test was performed on a liquid crystal display device having the same structure as that in the above-described preferred embodiment for examining the relationship between each width of the display substrate side peripheral portion, the step structure, and the gap and display irregularity caused due to load application to the liquid crystal display device.

Structure of Liquid Crystal Display Device 110 for Test Evaluation

Figure 4A:
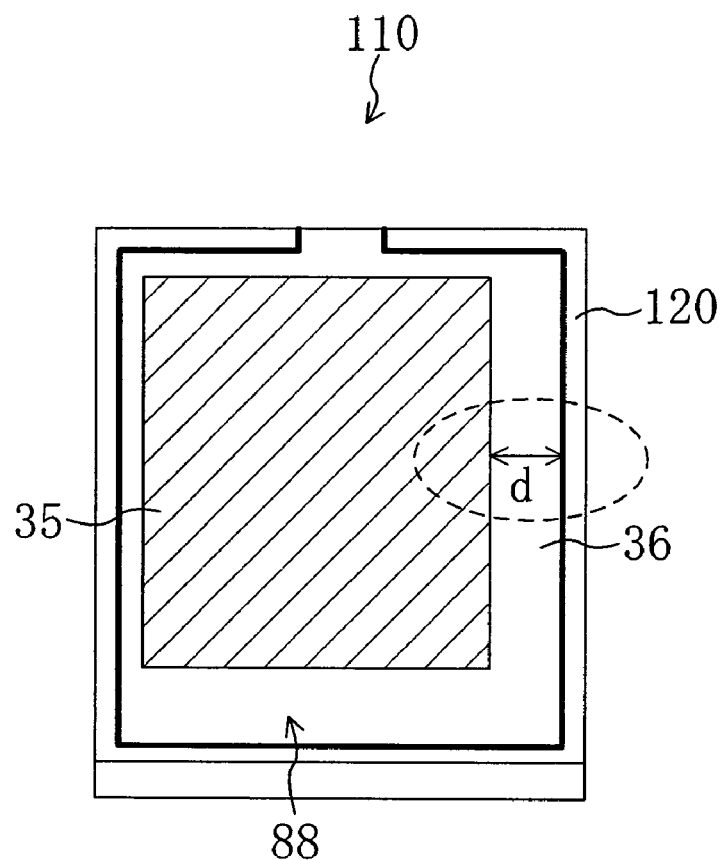
FIG. 4A is a plan view of a liquid crystal display device for test evaluation.
Figure 4B:
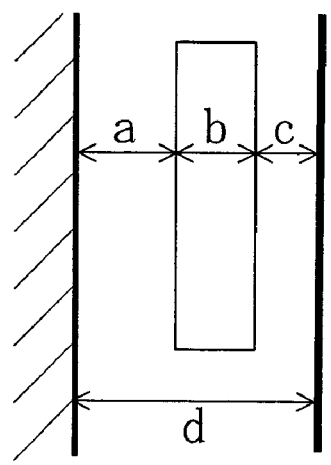
FIG. 4B is an enlarged view of a peripheral region of the liquid crystal display device.
Figure 5:
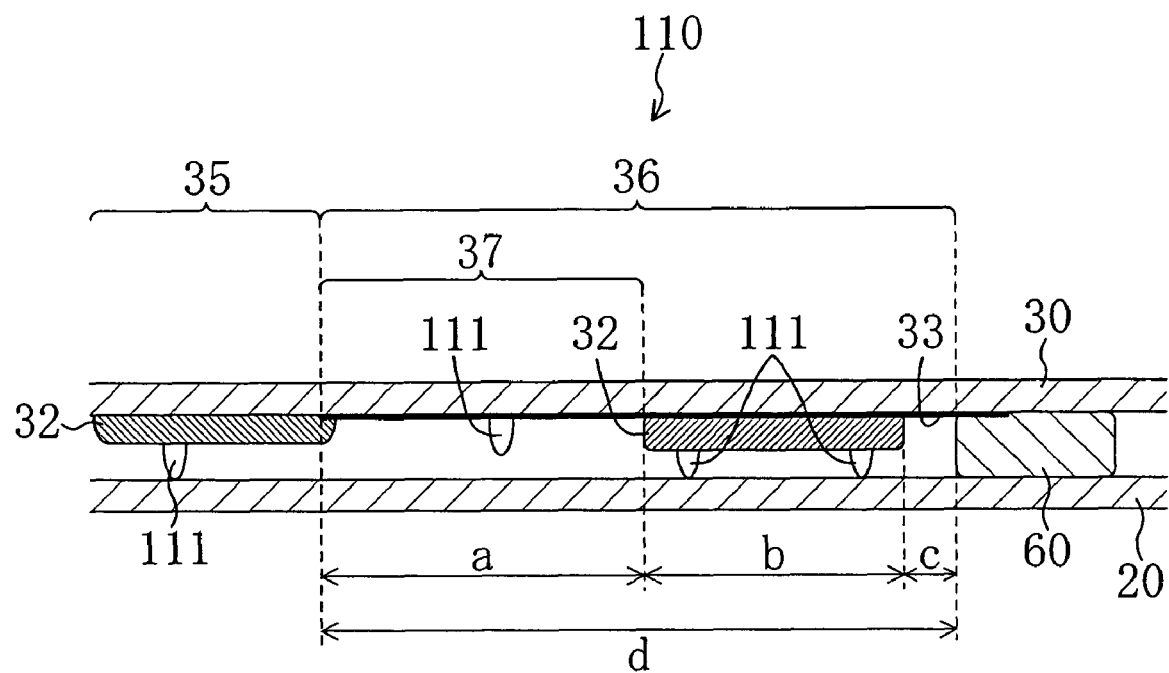
FIG. 5 is a sectional view of the liquid crystal display device for test evaluation.
Figure 6:
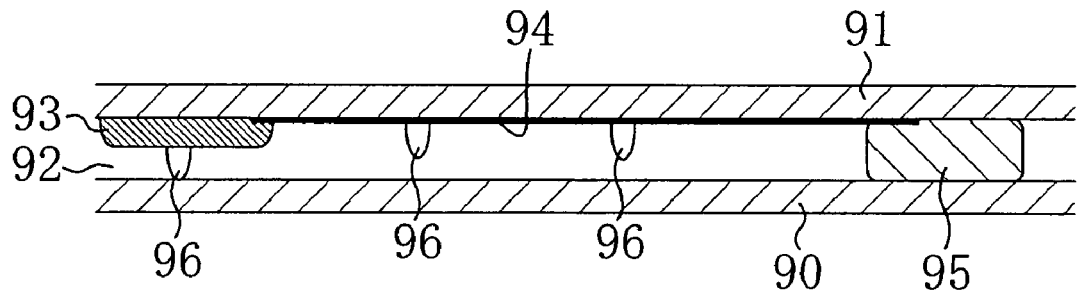
FIG. 6 is a sectional view of a display device using a conventional color filter substrate.
Figure 7:
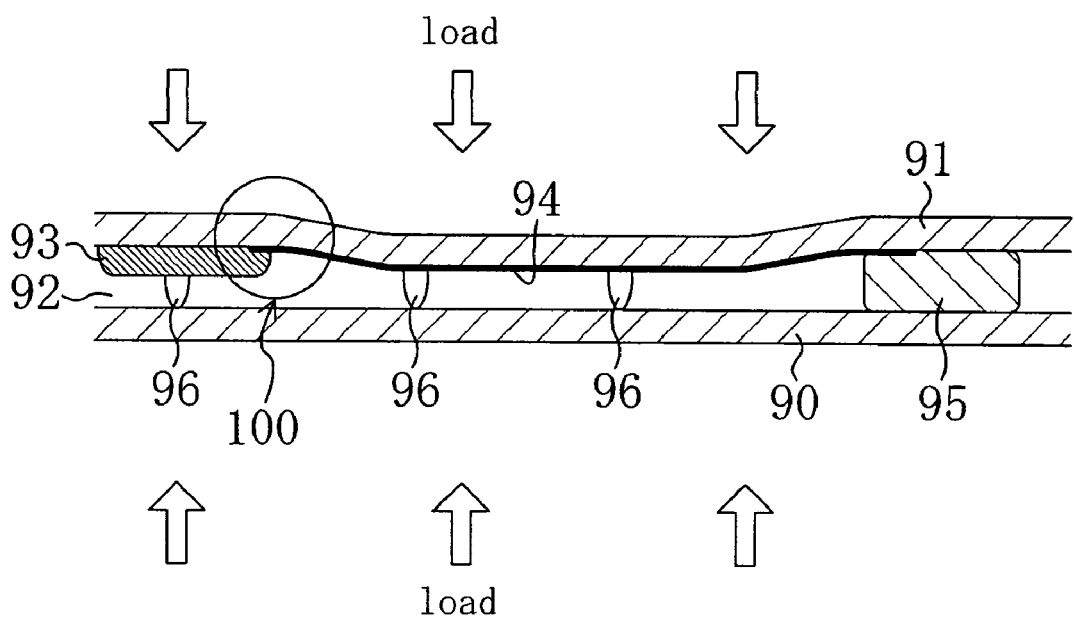
FIG. 7 is a diagram showing an aspect where an external load accompanied by a pressing step is applied to the display device using the conventional color filter substrate.
Figure 8:
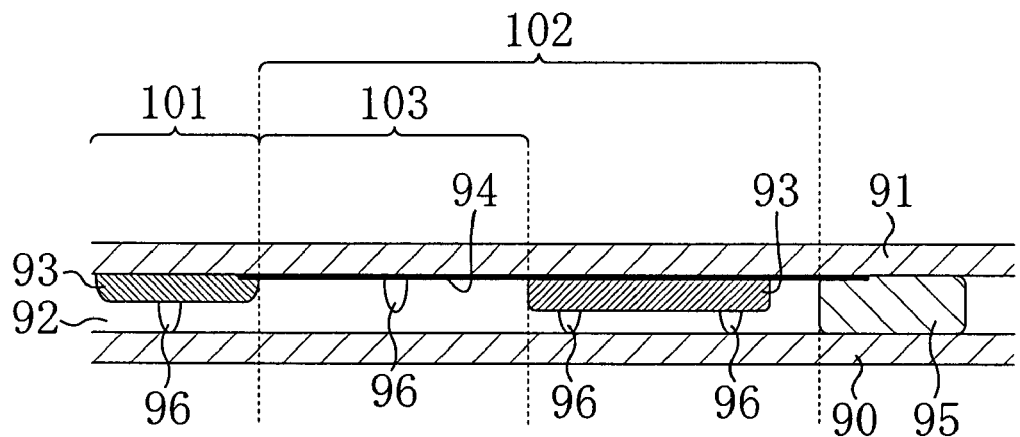
FIG. 8 is a sectional view of a display device using a color filter substrate in accordance with a preferred embodiment of the present invention.
Figure 9:
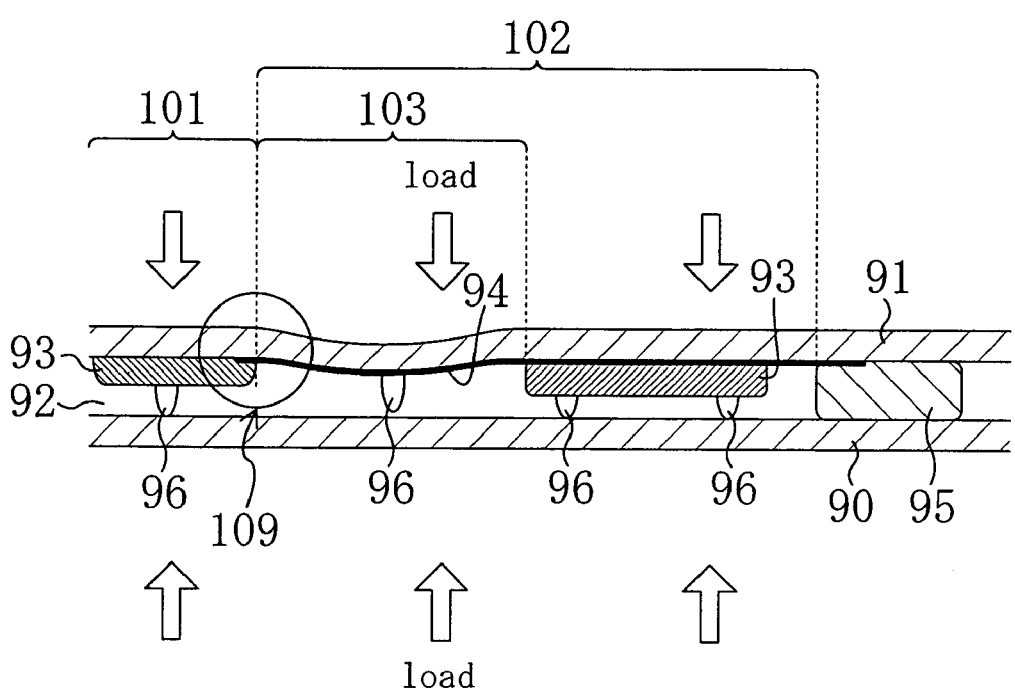
FIG. 9 is a diagram showing an aspect where an external load accompanied by a pressing step is applied to the display device using the color filter substrate in accordance with the present invention.
Figure 10:
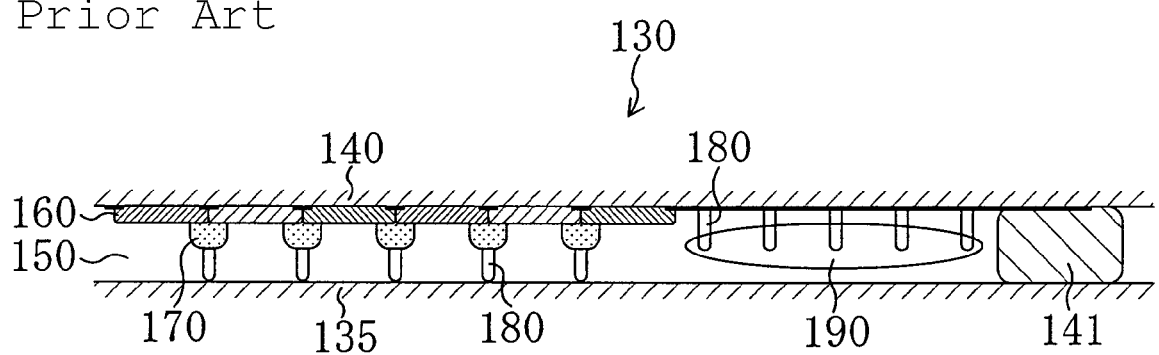
FIG. 10 is a sectional view of a transflective type liquid crystal display device including a reflection region and a transmission region in a display region and column-shaped spacers.
Figure 11:
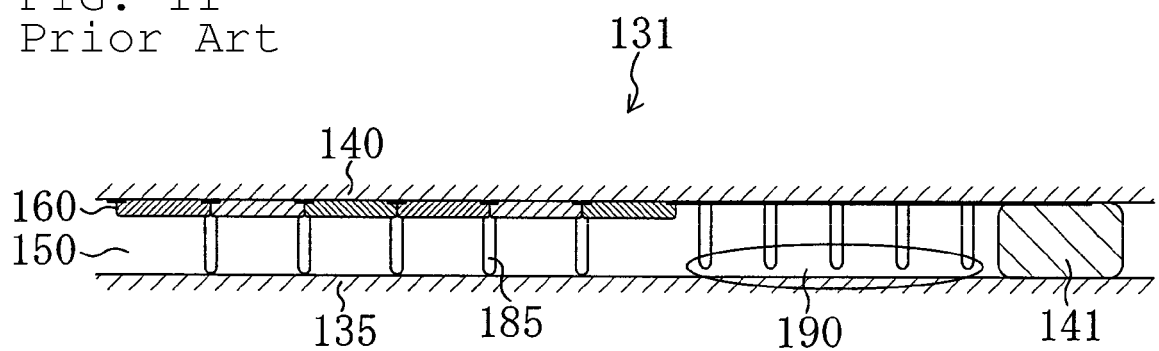
FIG. 11 is a sectional view of a reflective type or transmissive type liquid crystal display device including column-shaped spacers.
Figure 12:
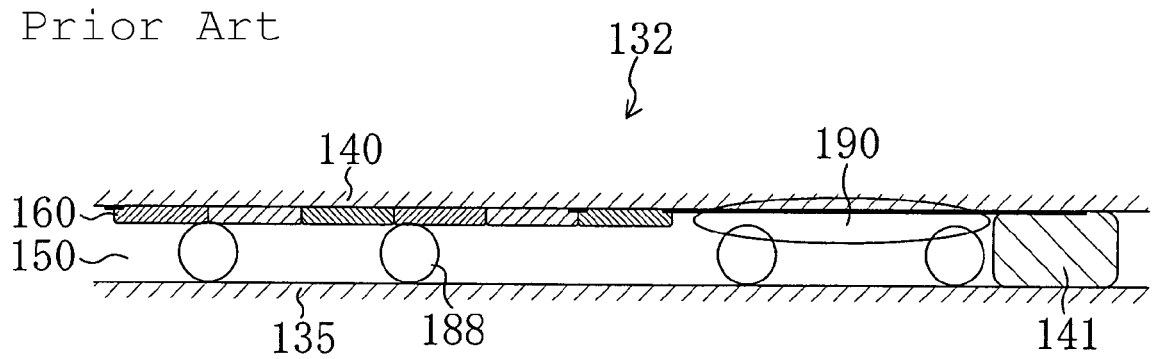
FIG. 12 is a sectional view of a reflective type or transmissive type liquid crystal display device including bead-shaped spacers.
Figure 13:
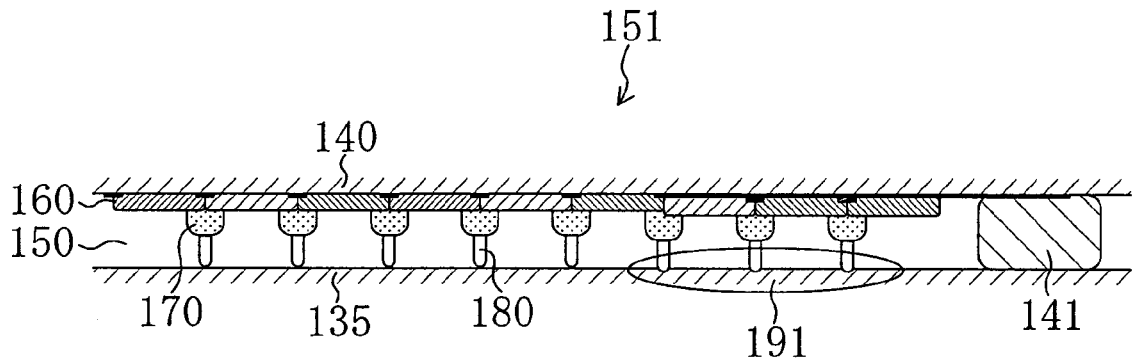
FIG. 13 is a sectional view of a transflective type liquid crystal display device including a reflection region and a transmission region in a display region and column-shaped spacers.
Figure 14:
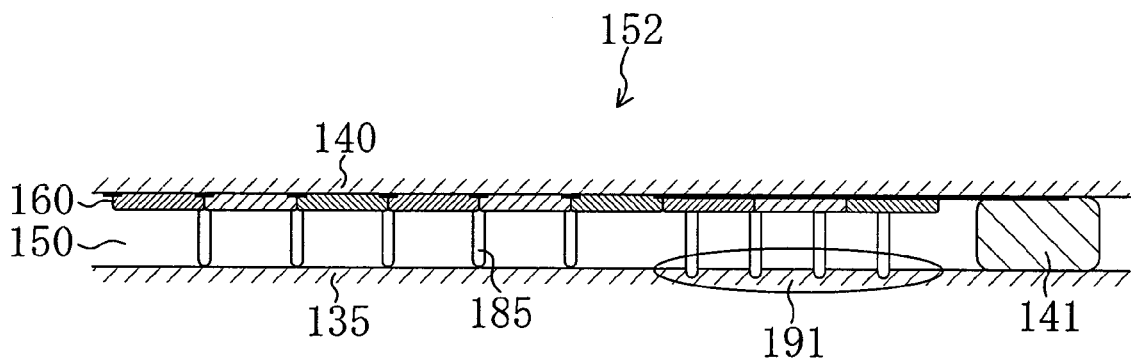
FIG. 14 is a sectional view of a reflective type or transmissive type liquid crystal display device including column-shaped spacers.
Figure 15:
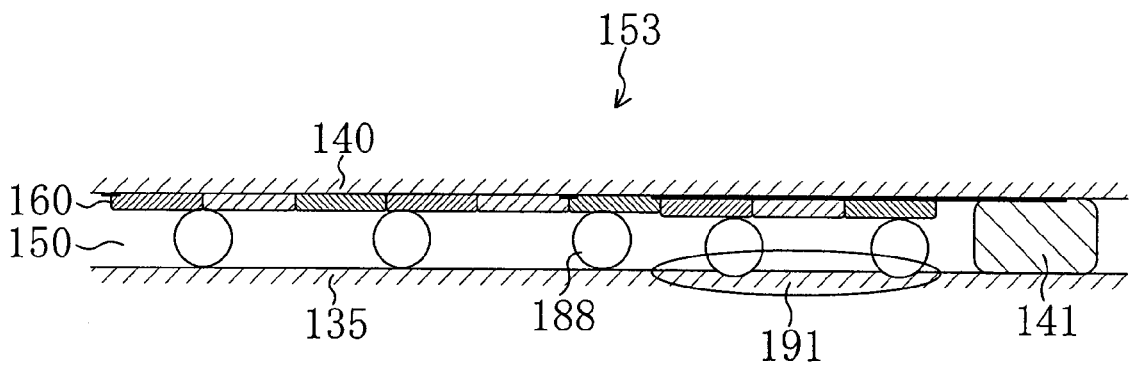
FIG. 15 shows a reflective type or transmissive type liquid crystal display device including bead-shaped spacers.

FIG. 4A is a plan view of a liquid crystal display device 110, FIG. 4B is an enlarged view showing the peripheral region enclosed by a dotted line in FIG. 4A at the end of the liquid crystal display device 110, and FIG. 5 is a sectional view of the liquid crystal display device 110. As shown in FIG. 4A and FIG. 4B, the liquid crystal display device 110 includes the light shielding region 36 in which the black matrix 33 is arranged around the outer periphery of the display region 35 and a bonding region 120 in which the sealant 60 is provided around the outer periphery of the light shielding region 36. The liquid crystal display device 110 is composed of the thin film transistor substrate 20 having a thickness of about 0.5 mm, the color filter substrate 30 having thicknesses of about 0.5 mm or about 0.1 mm, and the column-shaped spacers 111 and is manufactured by a predetermined pressing step, for example.

As the liquid crystal display device 110, several kinds of liquid crystal display devices were prepare which have different widths (a) of the display region side peripheral portion 37, namely, between the outer peripheral end of the display region 35 and the step structure (the color layer 32) formed in the light shielding region, different widths (b) of the color layer 32, and different widths (c) between the outer peripheral end of the color layer 32 and the inner peripheral end of the sealant 60.

Test Evaluation Method

In each of the above several kinds of liquid crystal panels manufactured by the predetermined pressing step, a polarizing plate with a predetermined retardation plate was bonded to each substrate to prepare the liquid crystal display devices 110 for evaluation.

Next, the presence or absence of display irregularity and the degree thereof (judged by using optical filters having 10% ND and 5% ND) were observed by viewing from the front the effective display region side peripheral portion and the entire panel (the entirety except the effective display region) in white display and a half-tone display (application of a voltage of 30 V and 30% of transmissivity).

In the evaluation, the display quality was judged by direct view (with no ND filter) and view through the ND filters to determine that one with no display irregularity recognized by direct view was evaluation acceptance and one with no display irregularity recognized by view through the 5% ND filter was evaluation conditional acceptance.

Evaluation Results

Table 1 lists the evaluation results of the liquid crystal display devices.

TABLE 1

| Support members of present invention | Injection method | Substrate thickness (first/second) (mm) | Width (mm) | | | | Rate of buffering region width a/d (times) | Display quality (display irregularity) | | |
|---|---|---|---|---|---|---|---|---|---|---|
| | | | a | b | c | d | | Peripheral part White | Half-tone | Total judge |
| absent | Ordinary vacuum injection | 0.5/0.1 | 0 | 0 | 0 | 0.7 | 0 | ○ | ○ | ○ |
| | | | 0 | 0 | 0 | 1.0 | 0 | ○ | ○ | ○ |
| | | | 0 | 0 | 0 | 1.5 | 0 | ○ | ○ | ○ |
| | | | 0 | 0 | 0 | 1.7 | 0 | ○ | ○ | ○ |
| | | | 0 | 0 | 0 | 1.8 | 0 | △ | ▲ | △ |
| | | | 0 | 0 | 0 | 2.0 | 0 | ▲ | × | × |
| | | | 0 | 0 | 0 | 3.0 | 0 | × | × | × |
| | | 0.5/0.5 | 0 | 0 | 0 | 1.8 | 0 | ○ | △ | △ |
| | | | 0 | 0 | 0 | 2.0 | 0 | △ | ▲ | △ |
| | One drop filling | 0.5/0.1 | 0 | 0 | 0 | 1.0 | 0 | ○ | ○ | ○ |
| | | | 0 | 0 | 0 | 1.5 | 0 | ○ | ○ | ○ |
| | | | 0 | 0 | 0 | 1.7 | 0 | ○ | △ | △ |
| | | | 0 | 0 | 0 | 1.8 | 0 | ▲ | ▲ | ▲ |
| | | | 0 | 0 | 0 | 2.0 | 0 | × | × | × |
| present | One drop filling | 0.5/0.1 | 0.8 | 0.2 | 0 | 1.0 | 0.8 | ○ | ○ | ○ |
| | | | 1 | 0.5 | 0 | 1.5 | 0.67 | ○ | ○ | ○ |
| | | | 1 | 0.7 | 0 | 1.7 | 0.59 | ○ | ○ | ○ |
| | | | 1 | 0.8 | 0 | 1.8 | 0.55 | ○ | ○ | ○ |

TABLE 1-continued

| Support members of present invention | Injection method | Substrate thickness (first/second) (mm) | Width (mm) | | | | Rate of buffering region width a/d (times) | Display quality (display irregularity) | | |
|---|---|---|---|---|---|---|---|---|---|---|
| | | | | | | | | Peripheral part | | Total |
| | | | a | b | c | d | | White | Half-tone | judge |
| | | | 1 | 1 | 0 | 2.0 | 0.5 | o | o | o |
| | | | 1 | 2 | 0 | 3.0 | 0.33 | o | o | o |
| | | | 1 | 4 | 0 | 5.0 | 0.2 | o | o | o |
| | | | 1.5 | 3.5 | 0 | 5.0 | 0.3 | o | Δ | Δ |
| | | | 1.5 | 3 | 0.5 | 5.0 | 0.3 | o | o | o |
| | | | 1 | 8.5 | 1 | 10.0 | 0.1 | o | o | o |
| | | | 2.5 | 7.5 | 0 | 10.0 | 0.25 | o | Δ | Δ |
| | | | 2.5 | 6.8 | 0.7 | 10.0 | 0.25 | o | o | o |
| | | | 1 | 18 | 1 | 20.0 | 0.05 | o | o | o |
| | | | 2.5 | 17.5 | 0 | 20.0 | 0.125 | Δ | Δ | Δ |
| | | | 2.5 | 16.5 | 1 | 20 | 0.125 | o | o | o |
| | | | 3 | 15.5 | 1.5 | 20 | 0.15 | o | Δ | Δ |

[Display irregularity: judge by viewing]
o; good in direct view
Δ; good through ND10% filter
▲; good through ND5% filter
x; no good through ND 5% filter
[Display irregularity; total judgment]
o; no display defect
Δ; conditional acceptance
x; display defect It is noted that pre-evaluation using conventional panels (with no support members arranged as in the present invention) confirmed that the favorable width (d) between the end of the display region and the end of the substrate bonding member (the pixel side of the sealant) where no significant display irregularity is recognized is in the range between about 0.7 mm to about 1.7 mm.

This aspect was recognized in both the ordinary injection method and the one drop filling method. By referencing the above results, the support members in the present invention were designed with the buffering region set to have a width of 1 to 1.5 mm as a standard for a panel of which width (d) is 5 mm or smaller. In so doing, it was liable to be difficult to design the width (a) to be 1 mm or smaller in view of the accuracy in patterning the color layer outside the display region.

Table 1 indicates the results of the evaluation test using the substrate bonding member obtained by mixing the inter-substrate space maintaining material with the sealing material. While, it was confirmed that irregularity was improved in the case where no inter-substrate space maintaining material is mixed with the sealing material with the width (c) set to zero (c=0).

Effects

The color filter substrate 30 in accordance with preferred embodiments of the present invention is a color filter substrate 30 preferably used in a display panel which includes the glass substrate 31; the color layer 32 provided on the glass substrate 31 and forming the display region 35; the light shielding layer 33 (the black matrix) arranged along the outer periphery of the display region 35 on the glass substrate 31 and defining the light shielding region 36; and the support members (the transparent dielectric layer 34 and the column-shaped spacers 50) standing in the display region 35 and the light shielding region 36 of the glass substrate 31, wherein the total height of the light shielding layer 33 of the light shielding region 36 and the support members 34, 50 disposed on the light shielding layer 33 is larger than the total height of the color layer 32 in the display region 35 and the support members 34, 50 disposed on the color layer 32 thereof, and the panel thickness buffering region is located in the display region side peripheral portion 37 of the light shielding region 36.

In the above arrangement, the support members 34, 50 for supporting the opposed substrates are not formed between the substrates in the display region side peripheral portion 37 of the light shielding region 36 where the panel thickness is larger by the light shielding layer 33 than the display region 35. Accordingly, the display region side peripheral portion 37 between the regions of which panel thickness are different from each other serves as a buffer region to absorb local change in cell thickness and stress on the step of the panel after the pressing step for liquid crystal injection to the panel, the bonding step, and the like, thereby suppressing color irregularity and cell thickness irregularity liable to be caused at the edge of the display region.

The color filter substrate 30 in accordance with preferred embodiments of the present invention may be a color filter substrate 30 used in a display panel which includes the glass substrate 31, the color layer 32 provided on the glass substrate 31 and forming the display region 35, and the light shielding layer 33 arranged along the outer periphery of the display region 35 on the glass substrate 31 and forming the light shielding region 36, wherein the step 32 having the same thickness as the color layer 32 located in the display region 35 is disposed on the light shielding layer 33 of the light shielding region 36, and the panel thickness buffering region is located in the display region side peripheral portion 37 of the light shielding region 36.

With the above arrangement, a display device 80 using bead-shaped spacers can be attained rather than a display device including the support members 34, 50 in the aforementioned color filter substrate 30. In such the display device 80, as well, the display region side peripheral portion 37 formed in the light shielding region 36 serves as a buffer region to absorb local change in cell thickness and stress on the step in the panel after the pressing steps for liquid crystal injection to the panel, for bonding, and the like, thereby suppressing color irregularity and cell thickness irregularity liable to be caused in display region side peripheral part.

A display device in accordance with preferred embodiments of the present invention is the display device 10 including a display panel including the first and second substrates 20, 30 opposed to each other and the display medium layer 40 interposed therebetween, and further includes the plurality of support members 34, 50 disposed on one of the first and second substrates 20, 30 so as to reach the other substrate in the display region 35 and the light shielding region 36 arranged along an outer periphery of the display region 35, wherein the total height of the light shielding layer 33 in the light shielding region 36 and the support members 34, 50 disposed on the light shielding layer 36 is larger than the total height of the color layer 32 in the display region 35 and the support members 34, 50 disposed on the color layer 32, and a panel thickness buffering region is located in a display region side peripheral portion 37 of the light shielding region 36.

In the display device 10 having the above arrangement, no support members 34, 50 supporting the opposed substrates are formed therebetween in the display region side peripheral portion 37 of the light shielding region 36 where the panel thickness is larger by the thickness of the light shielding layer 33 than the display region 35, as described above. Accordingly, the display region side peripheral portion 37 intervening between the regions of which panel thicknesses and stress on the step in the panel are different from each other serves as a buffer region to absorb local changes in cell thickness after the pressing step for liquid crystal injection to the panel, for bonding, and the like, thereby suppressing color irregularity and cell thickness irregularity liable to be caused in the display region side peripheral portion.

In the display device 10 in accordance with preferred embodiments of the present invention, each of the support members 34, 50 between the light shielding layer 33 and a substrate opposed thereto may include a step 32 having the same thickness as the color layer 32 formed in the display region 35, and a support portion extending from the step 32 so as to reach the substrate opposed thereto.

With the above arrangement, any of steps having various forms may be formed as the step 32 on a color filter substrate 30 in a multi-gap structure, which eliminates the need to form an additional step 32, thereby achieving excellent manufacturing efficiency.

Further, in the display device 10 in accordance with preferred embodiments of the present invention, the step 32 may be composed of the same color layer 32 as the color layer 32 formed in the display region 35.

With the above arrangement, the color layer 32 can be formed in the light shielding region 36 in the same step as the step of forming the color layer 32 in the display region 35. This eliminates the need to form the step 32 in an additional step, leading to excellent manufacturing efficiency.

In the display device 10 in accordance with preferred embodiments of the present invention, the bonding member 60 bonding the first substrate and the second substrate may be provided at an outer peripheral portion of the light shielding region 36, and the bonding member 60 may be spaced from the step 32.

It is preferable for controlling the space between the substrates to form a gap 61 having a predetermined width while an inter-substrate space maintaining material is mixed with the substrate bonding member 60. The gap 61 absorbs spreading of the bonding member 60 and secures the patterning margin at the step 32 as well as exhibition of a buffering function in space control. When the bonding member 60 with which the inter-substrate space maintaining material is mixed and the step 32 overlap with each other, the overlap portion increases in thickness locally to cause cell thickness irregularity in the display region 35 adjacent thereto.

Further, in the display device 10 in accordance with preferred embodiments of the present invention, the panel thickness buffering region 37 may have a width in a range between about 0.05 times and about 0.8 times a width from an outer peripheral end of the display region 35 to an inner peripheral end of the bonding member 60, wherein the range is inclusive.

Preferably, the panel thickness buffering region 37 has an appropriate width relative to the width between the outer peripheral end of the display region 35 and the inner peripheral end of the bonding member 60. Particularly, when it is set in the inclusive range between about 0.05 times and about 0.8 times the width between the outer peripheral end of the display region 35 and the inner peripheral end of the bonding member 60, display irregularity is further suppressed.

In the display device 10 in accordance with preferred embodiments of the present invention, a recess 39 may be formed in the peripheral portion 37 on the display region side of the light shielding region 36.

In the above arrangement, in forming the color layer 32 in the display region 35 and the light shielding region 36 in the same step, the color layer 32 is formed selectively in a region except the display region side peripheral portion37 of the light shielding region 36 to thus form the panel thickness buffering region in the display region side peripheral portion37 of the light shielding region 36, whereby a recess 39 recessed from the surrounding where no color layer 32 is formed is formed. When the spacers are formed in the same step thereafter, the support members 34, 50 not reaching the opposed substrate are formed in only the display region side peripheral portion 37 of the light shielding region 36. Thus, the panel thickness buffering region can be formed simply and efficiently in the manufacturing process.

Further, in the display device 10 in accordance with preferred embodiments of the present invention, each of the support members 34, 50 formed on the display region 35 and the light shielding region 36 may be formed on one of the substrates.

With the above arrangement, the support members 34, 50 in both the display region 35 and the light shielding region 36 can be formed in the same step to achieve excellent manufacturing efficiency.

In the display device 10 in accordance with preferred embodiments of the present invention, the support members may 34, 50 be arranged at regular intervals.

With the above arrangement, the support members 34, 50 arranged at regular intervals support uniformly the light shielding region 36 and the display region 35 against external load application accompanied by the pressing steps and the like. This suppresses local display irregularity effectively.

Moreover, in the display device 10 in accordance with preferred embodiments of the present invention, the display region 35 may include a light transmission region and a light reflection region.

The above arrangement eliminates the need to provide the step having the same thickness as the color layer 32 in the light shielding region 36 in some cases, for example, where the light shielding layer 33 in the light shielding region 36 is thick or the like. These cases only require formation of the spacers in the light shielding region 36, thereby leading to efficient device manufacture.

In the display device 10 in accordance with preferred embodiments of the present invention, a driver 88 may be provided in the light shielding region 36.

In a display device 10 using a thin film transistor substrate in which a driver 88 is incorporated, the light shielding region 36 must be wide. Accordingly, the width between the end of the display region and the end of the substrate bonding member (sealant 60) is smaller in the driver formation portion than in the driver non-formation portion, which means that the range between the display region 35 and the sealant 60 is asymmetric. For this reason, changes in cell thickness increase in the display region side peripheral portion 37 of the wide driver formation portion by influence of pressure and the like in a press-sealing step after display medium injection and the like to invite display irregularity. Further, in such the display device 10, though non-uniformity of changes in width of the space between the substrates caused due to load application to the surfaces of the substrates may increase, the above arrangement remarkably suppresses and minimizes the display irregularity caused due to such change in width of the space between the substrates.

Moreover, in the display device 10 in accordance with preferred embodiments of the present invention, the bonding member 60 may be arranged continuously around the display region 35 and surrounds the display region 35.

In a step of bonding a panel for the display device 10 with no display medium injection port, cell pressure irregularity is liable to be significant in the vicinity of the sealant 60 around the periphery of the panel. With the above arrangement, however, the panel thickness buffering region 37 absorbs such cell thickness irregularity effectively to suppress display irregularity effectively.

In the display device 10 in accordance with preferred embodiments of the present invention, the first substrate 20 may have a thickness different from the second substrate 30.

When a thin film transistor substrate as the first substrate 20 and an opposed color filter substrate 30 as the second substrate are thinned relatively, local heating and pressure are caused at the end of the substrates where a connection terminal, a driver 88, and the like are mounted directly to the thin film transistor substrate to invite breakage of the thin film transistor substrate thinner than a given thickness. With the above arrangement, however, such breakage can be prevented. Further, the thin film transistor substrate formed of multiple thin films for a terminal, a wiring, and the like is subjected to deformation accompanied by thermal contraction and compressive contraction and history through a step of stacking the thin films. The above arrangement prevents lowering of the mechanical strength which is caused due to thinning of the thin film transistor substrate.

Furthermore, in the display device 10 in accordance with preferred embodiments of the present invention, at least one of the first substrate 20 and the second substrate 30 may have a thickness of about 0.5 mm or smaller.

With the above arrangement, in the case where the glass should be thinned for thinning and weight reduction of the panel as a whole, thinning can be achieved by thinning the glasses of the first and second substrates 20, 30 to the same thickness or by thinning the glasses of the first and second substrate 20, 30 to the different thicknesses.

As describe above, the various preferred embodiments of the present invention are useful for a color filter substrate and a display device using it.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:
1. A display device comprising:
a display panel including first and second substrates opposed to each other and a display medium layer interposed therebetween; and
a plurality of support members arranged on one of the first and second substrates so as to reach the other substrate from a side of the one of the first and second substrates in a display region and a light shielding region extending along an outer periphery of the display region; wherein
a color layer is provided in the display region;
a step having the same thickness as the color layer located in the display region, the step being provided on a light shielding layer of the light shielding region;
a total height of the light shielding layer in the light shielding region, the step disposed on the light shielding layer, and the support members, which are provided on the step, is larger than a total height of the color layer in the display region and the support members located on the color layer;
a panel thickness buffering region is located between the step and the display region; and
the panel thickness buffering region is located in the light shielding region adjacent to the display region and includes an empty recess provided between the color layer and the step, the empty recess is arranged such that a dimension of a space within the empty recess between the first and second substrates is adjustable and the support members do not prevent adjustability of the dimension of the space.

2. The display device of claim 1, wherein the step is composed of the same color layer as the color layer located in the display region.

3. The display device of claim 1, wherein at least one bonding member arranged to bond the first substrate and the second substrate is provided at an outer peripheral portion of the light shielding region, and the at least one bonding member is spaced from the step.

4. The display device of claim 1, wherein the panel thickness buffering region has a width in a range between about 0.05 times and about 0.8 times a width from an outer peripheral end of the display region to an inner peripheral end of the at least one bonding member, wherein the range is inclusive.

5. The display device of claim 1, wherein a recess is formed in the peripheral portion on the display region side of the light shielding region.

6. The display device of claim 1, wherein each of the support members is located in the display region and the light shielding region is located on one of the substrates.

7. The display device of claim 1, wherein the support members are arranged at regular intervals.

8. The display device of claim 1, wherein the display region includes a light transmission region and a light reflection region.

9. The display device of claim 1, further comprising a driver in the light shielding region.

10. The display device of claim 3, wherein the at least one bonding member is arranged to extend continuously around the display region so as to surround the display region.

11. The display device of claim 1, wherein the first substrate has a thickness different from the second substrate.

12. The display device of claim 1, wherein at least one of the first substrate and the second substrate has a thickness of about 0.5 mm or less.

* * * * *